May 24, 1955

W. T. HAGE 2,709,233

ELECTRIC MOTOR SYSTEM FOR CONDITION TRANSMITTING
AND CONTROLLING APPARATUS

Filed June 15, 1951

INVENTOR
William T. Hage
BY
J P Moran
ATTORNEY

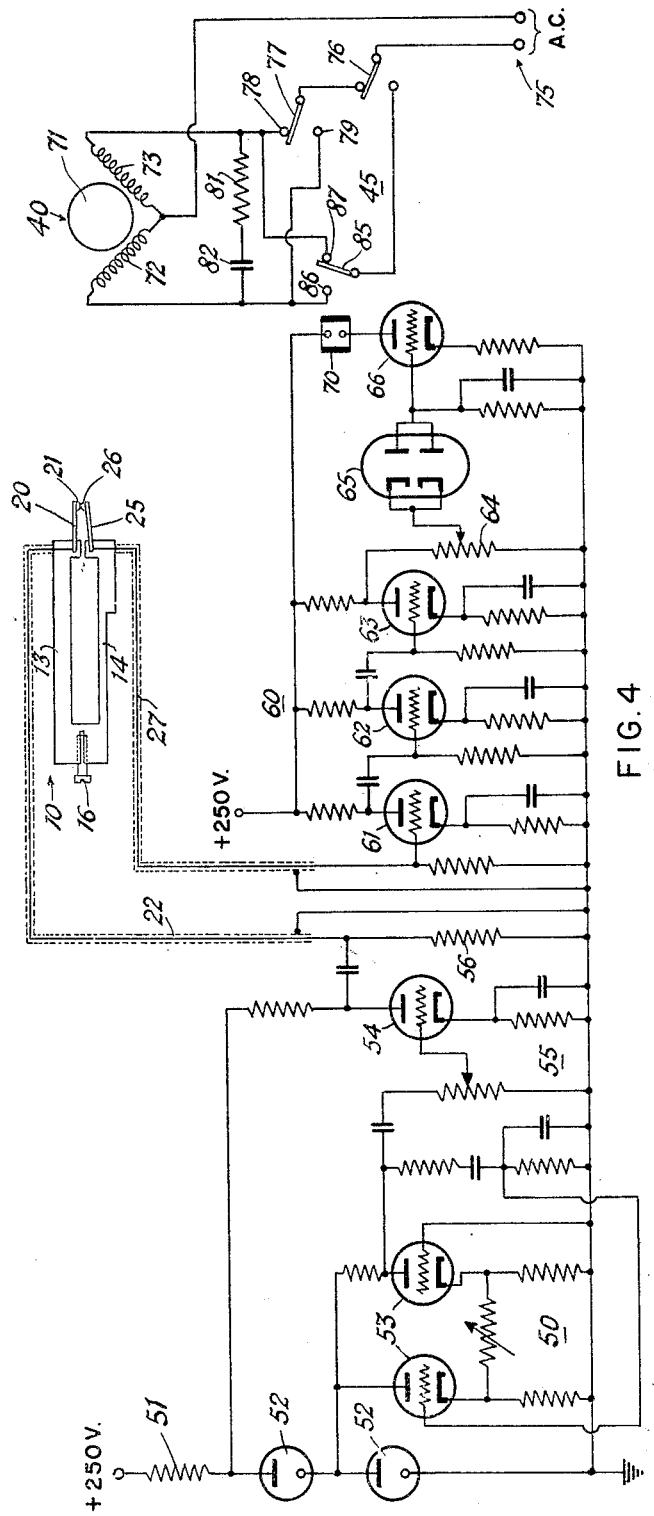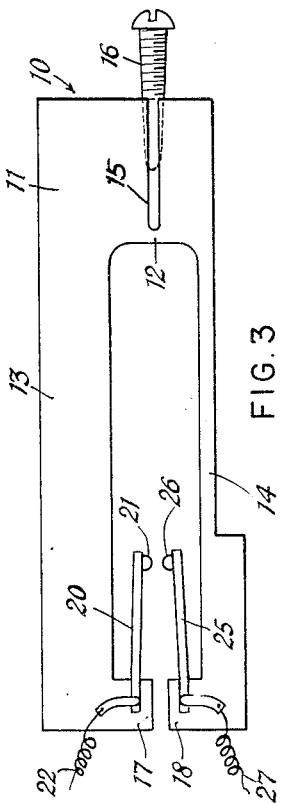

United States Patent Office 2,709,233

Patented May 24, 1955

2,709,233

ELECTRIC MOTOR SYSTEM FOR CONDITION TRANSMITTING AND CONTROLLING APPARATUS

William T. Hage, Alliance, Ohio, assignor to The Babcock & Wilcox Company, New York, N. Y., a corporation of New Jersey Application June 15, 1951, Serial No. 231,862

14 Claims. (Cl. 318—31)

This invention relates to a condition transmitter particularly adaptable to detecting, measuring, or controlling positional changes of such relatively small magnitude as to present difficulties in measuring.

In accordance with the principles of the present invention a pair of elements are mounted in a holder of such construction that the positions of the elements relative to each other are changed in accordance with a change in the value of a condition, for example, the change in dimension of a test specimen having stresses applied thereto. One of the two elements is of such a nature that, when an A.-C. potential is applied thereacross, it will vibrate at the frequency of the applied potential. The other element is of such a nature that, when mechanically vibrated, it will develop an A.-C. potential or signal voltage output having a frequency corresponding to that of the applied vibration. Consequently, when the two elements are in contact with an A.-C. potential applied to the first element, there will be an A.-C. signal output from the second element. This signal output may be utilized to indicate a change in position or to initiate a control action restoring the two elements to the pre-set relation.

More particularly, the invention arrangement comprises a two-arm generally U-shaped yoke of a metal which preferably has a substantially zero temperature coefficient of expansion, and each arm of the yoke has a piezo-electric crystal mounted at its free end. Each of these crystals, which may, for example, be Rochelle salt crystals, has a hardened bead affixed to its surface, these beads being aligned with each other. Crystals of this type, when they have an A.-C. potential applied thereto, will bend or vibrate at the applied frequency. Also, when such crystals are bent or vibrated mechanically, they will develop an A.-C. output potential at the applied mechanical frequency. Adjusting means are provided in the yoke so that the crystals may be set initially with their beads in contact or, alternatively, spaced a predetermined small amount.

An oscillator or other high frequency generator is connected to apply an A.-C. potential to one of the crystals, and the other crystal is connected to the input of an amplifier. This amplifier may have its output connected to control an indicator or a motor to operate the latter in accordance with changes in the amplifier input. For example, if the crystal beads are initially in contact, the amplifier will have an output. If the detector is arranged to detect a change in dimensions of a test specimen in such manner that the beads are separated upon such change in dimension, the corresponding interruption in amplifier output can be used to trigger a relay to energize a motor to restore the crystals to their initial position. Alternatively, the detector can be so arranged that the beads are initially separated so that, under normal conditions, there is no signal output from the driven crystal. Upon a change in the measured condition, the beads contact each other and the driven crystal output, as amplified, can trigger a relay to energize the motor to restore the initial position. Measuring means, such as a revolution counter or a micrometer screw driven by the motor may be used as an indicator of change in position.

For an understanding of the invention principles, reference is made to the following description of typical embodiments thereof as illustrated in the accompanying drawings.

In the drawings:

Fig. 3 is an enlarged side elevation view of the detector; and

Fig. 4 is a schematic wiring diagram of the strain controller shown in Fig. 1.

Figure 1:
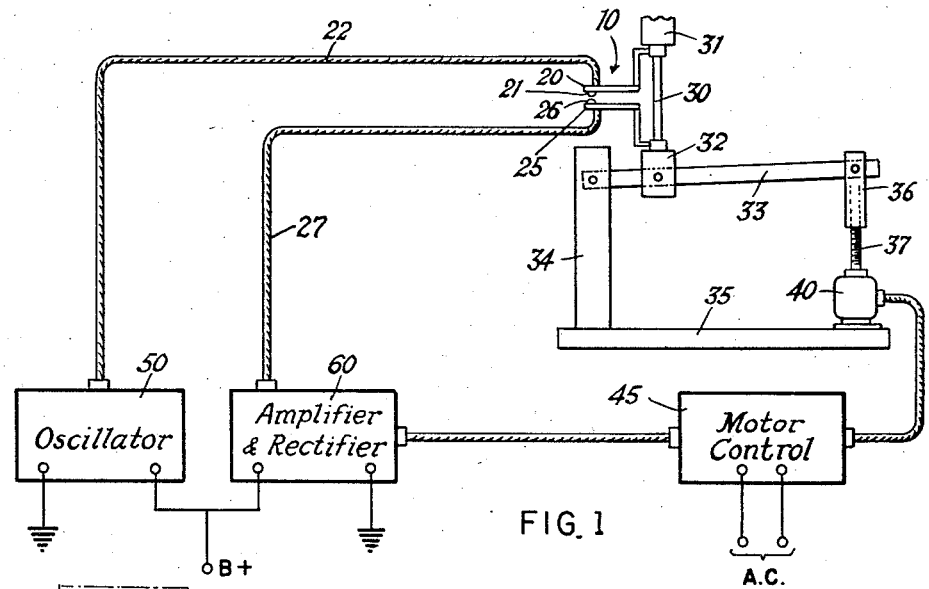
Fig. 1 is a schematic view of the invention detector as utilized in a strain control apparatus.

Referring first to Fig. 3 of the drawings, the particular form of detector therein illustrated includes a yoke 10 of "Invar," or other suitable material having substantially no dimensional change with changes in temperature. Yoke 10 has a base 11 slotted from its rear end, as at 15, to such a depth that only a relatively thin section 12 interconnects the arms 13 and 14 of the yoke. The slot 15 is tapered and threaded to receive a tapered adjusting screw 16 by means of which the spacing of the outer ends of arms 13 and 14 may be adjusted. Each of the arms has a turned-in outer end, such as 17 and 18, formed with a slot receiving a piezo-electric crystal such as 20 or 25. These crystals may be Rochelle salt crystals, or any other suitable type of crystal known to those skilled in the art. Crystal 20 has a sapphire bead 21 on one surface and crystal 25 has a sapphire bead 26 on a surface and aligned with bead 21. Leads 22 and 27 are respectively electrically connected to crystals 20 and 25.

For the purposes of the following description, crystal 20 will be referred to as the driving crystal and crystal 25 as the driven crystal. When an electric potential is applied to crystal 20 through lead 22, this crystal will vibrate at the frequency of the applied potential. If, by adjustment of screw 16, or by any other means, beads 21 and 26 are brought into contact, crystal 25 will be driven by crystal 20 at the applied frequency. When so driven, crystal 25 develops an A.-C. potential having a frequency equal to that of the mechanically applied frequency, and this potential or signal voltage may be applied through leads 27 to the input of an amplifier, for example.

Fig. 1 illustrates the detector 10 as incorporated in a strain controller, only the crystals 20 and 25 being illustrated to simplify the disclosure. Referring to Fig. 1, a specimen 30 to be tested is secured at one end to a fixed head 31 and crystal 20 or, in practice, arm 13 of yoke 10 is rigidly connected to the upper end of specimen 30. The lower end of the test specimen is connected to a movable head 32, and crystal 25 or, in practice, arm 14 of yoke 10, is also connected to head 32. In this particular arrangement, screw 16 is so adjusted as to bring the beads 21 and 26 initially into contact.

Movable head 32 is pivoted to the lever 33 having one end pivotally mounted on a post 34 of a fixed support 35. The other end of lever 33 has a nut 36 secured thereto and engaged with a screw 37 driven by a motor 40 supported on platform 35. When motor 40 operates in such a direction as to draw lever 33 downwardly, the stress on specimen 30 is increased, and rotation in the opposite direction moves the lever 33 upwardly to decrease the stress on specimen 30. Motor 40 is controlled as to direction and extent of rotation by a motor controller generally indicated at 45.

In the illustrated arrangement, a high frequency oscillator 50 is used to apply a high frequency electric potential to crystal 20 through lead 22. The particular frequency chosen is unimportant, but may be, for example, 3000 cycles. The criteria of frequency selection are that the applied frequency must be sufficiently above the normal power line frequency to eliminate errors from stray pick-up, and the frequency must be one which is not a resonant frequency of the crystal-yoke combination. Lead 27 connects driven crystal 25 to the input of a high-pass amplifier 60 and the output of the amplifier is applied to motor control 45.

The arrangement operates as follows. With beads 21 and 26 initially in contact and a high frequency applied to driving crystal 20 from oscillator 50, driven crystal 25 is vibrated at the applied frequency so as to develop a signal voltage which is fed to amplifier 60. The output of the amplifier biases motor control 45 to maintain motor 40 inoperative. If specimen 30 elongates under the applied stress, which might occur, for example, if the specimen were heated for a creep determination, the beads 21 and 26 separate and driven crystal 25 no longer develops a signal voltage. The interruption of the amplifier output biases motor control 45 to operate motor 40 in such a direction as to bring the crystal beads back into contact. When this occurs, the driven crystal again develops an output or signal voltage biasing the motor control to stop motor 40.

An alternative manner of operation is to initially adjust the crystal yoke to separate the beads a slight distance. With a change in dimension of specimen 30, the beads are brought into contact and the resultant amplifier output biases or triggers control 45 to operate motor 40 to increase the stress on specimen 30 to separate the crystal beads.

Figure 2:
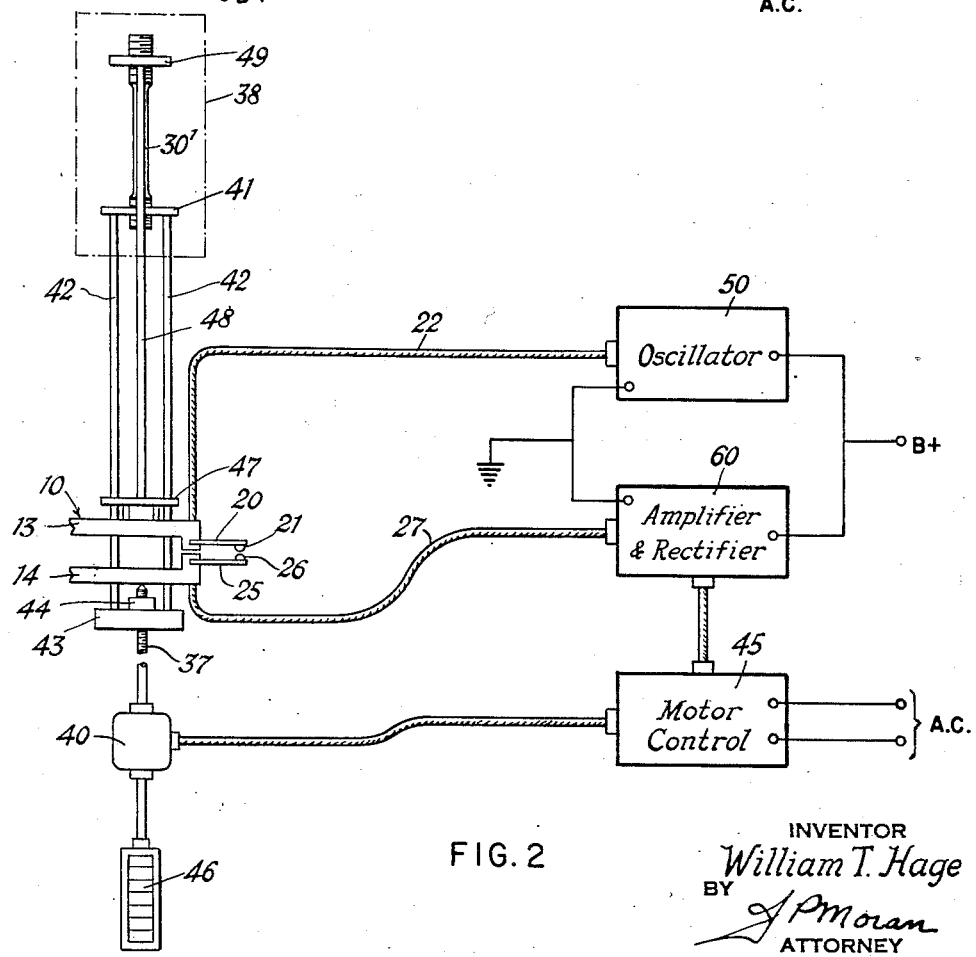
Fig. 2 is a schematic view of the invention detector as incorporated in an extension measuring system.

Fig. 2 illustrates the detector as applied to an extension measuring system. In this arrangement, a test specimen 30', whose creep is to be determined, is mounted within a furnace schematically illustrated at 38. A yoke 41 is secured to the lower end of specimen 30' and connected by rods 42 to a cross-bar 43 on which is a nut 44 receiving a screw 37 driven by motor 40. The motor 40 is also connected to a revolution counter 46. Yoke 10 has its upper arm 13 secured to a cross-bar 47 connected by rods 48 to a yoke 49 secured to the upper end of the test specimen 30'. The other arm 14 of yoke 10 bears against the end of screw 37, which may be a micrometer screw.

When specimen 30' creeps, beads 21 and 26 are separated, and motor 40 is operated to drive screw 37 to bring the two beads back into contact, the amount of movement required for this being indicated by screw 37 or by revolution counter 46. As in the arrangement of Fig. 1, oscillator 50 applies a high frequency potential to crystal 20 to vibrate the latter to drive crystal 25 whose signal output is applied through lead 27 to amplifier 60 which appropriately biases motor control 45 to achieve the desired response of the motor to changes in the length of specimen 30'.

Fig. 4 illustrates a typical wiring diagram for use with the strain controller of Fig. 1. A suitable source of positive potential is connected through a resistor 51 and voltage regulating tubes 52, 52 to apply plate potential to the valves 53 of an oscillator 50, and to the valve 54 of a buffer 55. The high frequency output of oscillator 50 is applied, through buffer 55, across an output resistance 56 and through shielded lead 22 to crystal 20. Buffer 55 prevents a feed-back into oscillator 50 of the high frequency output developed in the detector 10. Shielded lead 27 applies the output of driven crystal 25 to the input of a high-pass amplifier 60 including three (3) amplifier valves 61, 62 and 63. The ouput of amplifier 60 is applied across an output resistor 64 to the input of a full wave rectifier 65. The rectified amplified output signal from rectifier 65 is applied to the control grid of a triode 66 connected in series with a relay 70 forming part of motor control 45.

Motor 40 is indicated as having an armature 71 and field windings 72, 73 selectively energizable for opposite directions of rotation of motor 40. The junction point of two (2) field windings is connected to one terminal of a suitable A.-C. source 75, and the other terminal of source 75 is connected to a double-throw switch 76. Switch 76 is used to condition the apparatus for either manual or automatic operation. The switch is shown in the "manual" position wherein it is connected to a motor reversing switch 77 selectively engageable with either of a pair of contacts 78 or 79 respectively connected to field windings 72 and 73. A resistor 81 and a condenser 82 are connected across the outer ends of the two (2) field windings.

Normally, the apparatus of Fig. 1 is started with switch 76 in the "manual" position. After the apparatus has been started, switch 76 is moved to the automatic position wherein it connects to an armature 85 of relay 70. This armature is selectively engageable, depending upon the condition of relay 70, with either of a pair of contacts 86 or 87 connected each to a different one of the field windings. The arrangement operates in the manner previously described in connection with Fig. 1.

The described condition transmitter and detector provides a sensitive means for readily detecting minute changes in condition or position, and biasing control apparatus responsive to such changes. While piezo-electric crystals have been indicated as the preferred detector means, other means having similar characteristics may also be used. For example, the crystals may be replaced by magneto-strictive elements.

While specific embodiments of the invention have been shown and described in detail to illustrate the application of the invention principles, it will be understood that the invention may be otherwise embodied without departing from such principles.

I claim:

1. A condition transmitter comprising, in combination, a vibratory driving element; means operable to vibrate said driving element; a vibratory driven element vibratable by engagement with said driving element; means mounting said elements in initially pre-settable and separable relation to each other for relative engagement and disengagement responsive to changes in the measured condition; and vibration detecting means operatively connected to said driven element to detect such condition change by detecting when said driven element is vibrated through engagement thereof by said driving element.

2. A condition transmitter comprising, in combination, a vibratory driving element; means operable to vibrate said driving element; a vibration activated electric potential developing driven element vibratable by engagement with said driving element; means mounting said elements in initially presettable and separable relation to each other for relative engagement and disengagement responsive to changes in the measured condition; and electric potential responsive detecting means operatively connected to said driven element to detect such condition change by detecting when said driven element is vibrated through engagement thereof by said driving element.

3. A condition transmitter comprising, in combination, a vibratory driving element; means operable to vibrate said driving element; a vibration activated electric potential developing driven element operable to develop a signal potential when it is vibrated by engagement with said driving element; means mounting said elements in initially presettable and separable relation to each other for relative engagement and disengagement responsive to changes in the measured condition; and signal potential responsive means electrically connected to said driven element to detect such condition change by detecting when said driven element is vibrated through engagement thereof by said driving element.

4. A condition transmitter comprising, in combination, a driving element vibratable responsive to an impressed A.-C. potential; means impressing an A.-C. potential on said driving element; a vibratory driven element vibratable by engagement with said driving element; means mounting said elements in initially presettable and separable relation to each other for relative engagement and disengagement responsive to changes in the measured condition; and vibration detecting means operatively connected to said driven element to detect such condition change by detecting when said driven element is vibrated through engagement thereof by said driving element.

5. A condition transmitter comprising, in combination, a driving element vibratable responsive to an impressed A.-C. potential; means impressing an A.-C. potential on said driving element; a vibration activated electric potential developing driven element vibratable by engagement with said driving element; means mounting said elements in initially presettable and separable relation to each other for relative engagement and disengagement responsive to changes in the measured condition; and electric potential responsive detecting means operatively connected to said driven element to detect such condition change by detecting when said driven element is vibrated through engagement thereof by said driving element.

6. A condition transmitter comprising, in combination, a driving element vibratable responsive to an impressed A.-C. potential; means impressing an A.-C. potential on said driving element; a vibration activated electric potential developing driven element operable to develop a signal potential when it is vibrated by engagement with said driving element; means mounting said elements in initially presettable and separable relation to each other for relative engagement and disengagement responsive to changes in the measured condition; and signal potential responsive means electrically connected to said driven element to detect such condition change by detecting when said driven element is vibrated through engagement thereof by said driving element.

7. A condition transmitter comprising, in combination a two armed forked yoke; a vibratory driving element mounted on the free end of one arm; means operable to vibrate said driving element; a vibratory driven element mounted on the free end of the other arm and vibratable by engagement with said driving element; adjusting means operable on the arms of said yoke to adjust the initial position of said elements relative to each other; means connected to said yoke to effect relative movement of the arms to effect relative engagement and disengagement of said elements responsive to a change in the measured condition; and vibration detecting means operatively connected to said driven element to detect such condition change by detecting when said driven element is vibrated through engagement thereof by said driving element.

8. A condition transmitter comprising, in combination, a two armed forked yoke; a driving element vibratable responsive to an impressed A.-C. potential mounted on the free end of one arm; means impressing an A.-C. potential on said driving element; a vibration activated electric potential developing driven element mounted on the free end of the other arm and operable to develop a signal potential when it is vibrated by engagement with said driving element; adjusting means operable on the arms of said yoke to adjust the initial position of said elements relative to each other; means connected to said yoke to effect relative movement of the arms to effect relative engagement and disengagement of said elements responsive to a change in the measured condition; and signal potential responsive means electrically connected to said driven element to detect such condition change by detecting when said driven element is vibrated through engagement thereof by said driving element.

9. A condition transmitter comprising, in combination a piezo-electric driving crystal; means impressing an A.-C. potential on said crystal to vibrate the same; a piezo-electric driven crystal vibratable by engagement with said driving crystal to develop an A.-C. signal potential; means mounting said crystals in initially pre-settable and separable relation to each other for relative engagement and disengagement responsive to changes in the measured condition; and signal potential responsive means electrically connected to said driven crystal to detect such condition change by detecting when said driven crystal is vibrated through engagement thereof by said driving crystal.

10. A condition transmitter comprising, in combination, a two armed forked yoke; a piezo-electric driving crystal mounted on the free end of one arm; means impressing an A.-C. potential on said crystal to vibrate the same; a piezo-electric driven crystal vibratable by engagement with said driving crystal to develop an A.-C. signal potential and mounted on the free end of the other arm; adjusting means operable on the arms of said yoke to adjust the initial position of said crystals relative to each other; means connected to said yoke to effect relative movement of the arms to effect relative engagement and disengagement of said crystals responsive to a change in the measured condition; and signal potential responsive means electrically connected to said driven element to detect such condition change by detecting when said driven element is vibrated through engagement thereof by said driving crystal.

11. Specimen testing apparatus comprising, in combination, a vibratory driving element; means operable to vibrate said driving element; a vibratory driven element vibratable by engagement with said driving element; means mounting said elements in initially pre-settable relation to each other; means fixing said elements relatively to a pair of spaced points on the specimen for relative movement upon a change in the spacing of said points; vibration detecting means operatively connected to said driven element to detect such change in spacing by detecting when said driven element is vibrated; and means connected to said mounting means and said detecting means and operable upon said mounting means, responsive to a detected change in such spacing, to restore the initial setting of said elements.

12. Specimen testing apparatus comprising, in combination, a piezo-electric driving crystal; means impressing an A.-C. potential on said crystal to vibrate the same; a piezo-electric driven crystal vibratable by engagement with said driving crystal to develop an A.-C. signal potential; means mounting said crystals in initially pre-set table relation to each other; means fixing said crystals relatively to a pair of spaced points on the specimen for relative movement upon a change in the spacing of said points; signal potential responsive means electrically connected to said driven crystal to detect such change in spacing by detecting when said driven crystal is vibrated; and means connected to said mounting means and said signal potential responsive means and operable upon said mounting means, responsive to a detected change in such spacing, to restore the initial setting of said crystals.

13. Specimen testing apparatus comprising, in combination, a two armed forked yoke; a piezo-electric driving crystal mounted on the free end of one arm; means impressing an A.-C. potential on said crystal to vibrate the same; a piezo-electric driven crystal vibratable by engagement with said driving crystal to develop an A.-C. signal potential and mounted on the free end of the other arm; adjusting means operable on the arms of said yoke to adjust the initial position of said crystals relative to each other; means fixing said arms relatively to a pair of spaced points on the specimen for relative movement upon a change in the spacing of said points; signal potential responsive means electrically connected to said driven crystal to detect such change in spacing by detecting when said driven crystal is vibrated; and means connected to said yoke and said signal potential responsive means and operable upon said arms, responsive to a detected change in such spacing to restore the initial setting of said crystals.

14. Specimen testing apparatus comprising, in combination, a two armed forked yoke; a piezo-electric driving crystal mounted on the free end of one arm; means impressing an A.-C. potential on said crystal to vibrate the same; a piezo-electric driven crystal vibratable by engagement with said driving crystal to develop an A.-C. signal potential and mounted on the free end of the other arm; adjusting means operable on the arms of said yoke to adjust the initial position of said crystals relative to each other; means fixing said arms relatively to a pair of spaced points on the specimen for relative movement upon a change in the spacing of said points; signal potential responsive means electrically connected to said driven crystal to detect such change in spacing by detecting when said driven crystal is vibrated; electric motor driven means operable upon said yoke to change the relative position of said crystals; and a controller connected to said potential responsive means and said motor and controlling the latter, responsive to a detected change in such spacing, to restore the initial setting of said crystals.

References Cited in the file of this patent
UNITED STATES PATENTS

| | | |
|---|---|---|
| 2,137,852 | Nicholson | Nov. 22, 1938 |
| 2,331,617 | Moore | Oct. 12, 1943 |
| 2,370,194 | Riggs | Feb. 27, 1945 |
| 2,505,258 | Robinette | Apr. 25, 1950 |